United States Patent Office 3,799,949
Patented Mar. 26, 1974

3,799,949
PROCESS FOR THE PREPARATION OF EPICHLOR-
HYDRIN FROM ALLYLCHLORIDE
Rudolf Keller, Ziegelhausen, Manfred Kruger, Offenbach, Theodor Lussling, Grossauheim, Ewald Noll, Grosskrotzenburg, Gerd Schreyer and Herbert Tanner, Grossauheim, and Wolfgang Weigert, Offenbach, Germany, assignors to Deutsche Gold- und Silber-Scheideanstalt vormals Roessler, Frankfurt am Main, Germany
Filed Nov. 29, 1971, Ser. No. 202,842
Claims priority, application Germany, Dec. 8, 1970,
P 20 60 190.5
Int. Cl. C07d 1/16
U.S. Cl. 260—348.5 L                       4 Claims

ABSTRACT OF THE DISCLOSURE

Allyl chloride in excess is epoxidized with a solution of perpropionic acid or perbutyric acid to form epichlorhydrin. The excess allyl chloride and epichlorhydrin formed are separated by distillation.

---

Figure 1:
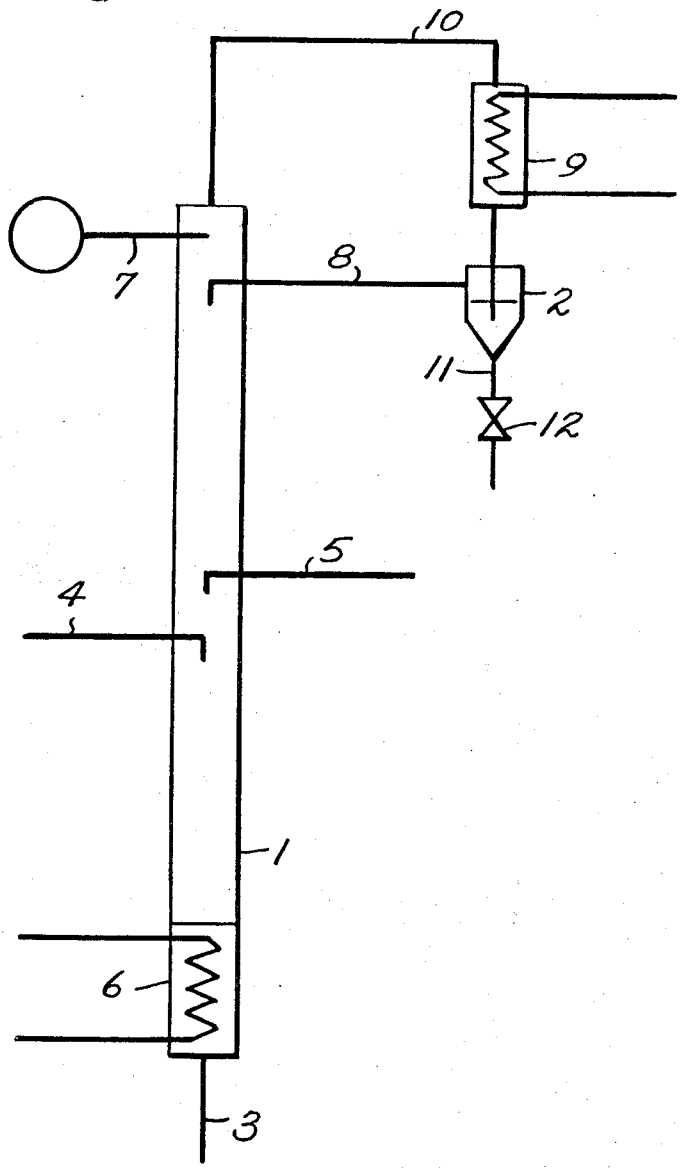

In application Ser. No. 60,872 filed Aug. 4, 1970, now U.S. Pat. No. 3,708,507 (corresponding to German application P 19 42 557.1-42) there are obtained anhydrous solutions of percarboxylic acids which are to be used for the epoxidation of olefinically unsaturated compounds by extraction and/or azeotropic distillation of aqueous solutions of these percarboxylic acids with the compounds to be epoxidized. The extract thus obtained can then be treated in known manner.

As started in application 60,872, it is known to convert materials having olefinically unsaturated double bonds to the corresponding epoxides using water free solutions of peracetic acid in a suitable inert solvent (see Frostick, et al. Jour. Amer. Chem. Soc. 81, 3350-6 (1959)). Although this process is used to the greatest practicable extent in many cases long reaction times are required, especially with olefins that are difficultly epoxidizable, as, for example, esters or ethers having an allylic double bond as well as olefins with a terminal double bond. Besides, there must be made allowance for unsatisfactory reactions and yields. In this case the presence of the solvent necessary for the peracetic acid noticeably reduces the concentration of the reaction and also must be again separated and therefore represents a ballast.

It is also known to react the epoxidizable liquid compounds countercurrently with peracetic acid or perpropionic acid. The process, however, only proceeds favorably if the per acid is used in strong dilution with organic compounds such as acetic acid or in the presence of acetaldehyde or an organic solvent such as acetone (Celanese, English Pat. 1,053,972). Otherwise the danger of explosion is too great. Therefore the process is primarily operated with raw gases from the acetaldehyde oxidization (Kreisler, German Pat. 1,266,302 and Celanese British Pat. 1,053,972).

It has now been found that olefinically unsaturated, difficulty epoxidazable water insoluble compounds can be epoxidized in an industrially simple and less dangerous form with organic percarboxylic acids which contain at least 2 carbon atoms, if one proceeds with an aqueous solution of this per carboxylic acid and removes water with help of the compounds to be epoxidized by extraction and/or azeotropic distillation. The thus obtained water free solution of percarboxylic acid in the excess unsaturated compound is then held at 30–100° C. until the desired reaction of percarboxylic acid with the olefinic compound to form the corresponding epoxide is obtained. Preferably the reaction is continued until the percarboxylic acid is completely reacted, since in such case the working up is greatly simplified.

In the event the olefinic compound to be epoxidized forms a minimum azeotrope with water it is brought in excess amount, into contact with pure aqueous percarboxylic acid in a suitable distillation column equipped with a water trap in which case a water free solution of percarboxylic acid in the unsaturated compound collects in the sump while the water in the form of an azeotrope with the unsaturated compound is removed in vapor form overhead and after condensation of the vapors in the water trap is separated from the unsaturated compound which latter is again returned to the column.

FIG. 1 of the drawings is a diagrammatic illustration of a continuous azeotropic distillation according to the invention of the application 60,872.

Referring more specifically to FIG. 1 of the drawings there is provided a distillation column 1. Percarboxylic acid solution is introduced by way of conduit 5 and the compound to be epoxidized is introduced via conduit 4. The column is also equipped with heat exchanger 6 and thermometer 7. The azeotrope of water and unsaturated compound is led via conduit 10 and heat exchanger 9 into water trap 2 whereby after the separation the recovered unsaturated compound is returned to the column via conduit 8 while the water leaves the system via conduit 11 and valve 12. The solution of percarboxylic acid in the compound to be epoxidized collecting in the sump of column 1 is withdrawn via conduit 3.

The pressure in the column should be adjusted so that the sump temperature is the region in which no significant destruction takes place of the percarboxylic acid employed. Preferably the temperature is between 20 and 80° C. but it can be as low as 0° C. or as high as 110° C. In the process of the azeotropic removal of water there already takes place a partial reaction to the epoxide. For complete reactions the sump product is subjected to a subsequent reaction at 30°–100° C.

In another form of the invention the percarboxylic acids can be extracted from their aqueous solution by the unsaturated compounds themselves which are to be epoxidized employing known processes for extraction. Thus there can be used any of the processes disclosed in the article in Vauck-Müller, Grundoperationen Chemischer Verfahrenstechnik (1966) pages 662, et seq. The entire disclosure of the article in Vauck-Müller is hereby incorporated by reference. After the extraction the solution of percarboxylic acid in the compound to be epoxidized is subjected to a subsequent reaction at 30–100° C. The extraction, like the azeotropic dehydration, can be carried out continuously or batchwise. If the percarboxylic acid extract still contains small amounts of water these can be easily removed by a subsequent azeotropic dehydration, for example in the manner described above.

The aqueous solutions of percarboxylic acids employed can be used in any desired concentration of the percarboxylic acid. Preferably they are pure aqueous solutions in the concentrations which are produced, for example by the processes described in German patent No. 1,165,576, German Auslegeschrift 1,170,926 and Weiberg U.S. Pat. 3,264,346, e.g. about 40 to 60% of lower peralkanoic acid and 60 to 40% of water by weight although the water can vary from 20 to 90% by weight. Examples of suitable percarboxylic acids include peracetic acid, perpropionic acid, perbutyric acid, perisobutyric acid and pervaleric acid.

The molar proportions of olefinically unsaturated compound to the percarboxylic acid can be adjusted at pleasure and is not critical. Preferably the proportions range between 1.2 and 25 to 1.

The working up of the reaction mixture obtained by the process of the invention can take place in known manner, for example by distillation or extraction.

As difficultly epoxidizable compounds which can be employed in the described epoxidation process mention is made of the following:

Unsaturated hydrocarbons (for example diisobutylene, styrene, para menthene, octadecene-1, nonene-2, octylene, alpha-pinene, camphene, beta-pinene, stilbene, cycloheptene, alpha carotene, beta carotene, limonene, dihydronaphthalene, indene, cyclohexene, cyclopentadiene, heptene-1, hexene-1, isoprene, p-methylstyrene, 1-vinylcyclohexane), allyl and vinyl esters (for example allyl acetate, allyl propionate, vinyl acetate, vinyl stearate, allyl stearate, allyl butyrate, vinyl hexanonate), unsaturated ethers (for example diallyl ether, 2-methallyl ethyl ether, di (2-methallyl) ether, ethyl vinyl ether, divinyl ether, allyl 2-methyl propen-2-yl ether, allyl methyl cyclohexen-3-yl ether, allyl butene-2-yl ether, allyl ethyl ether, allyl cyclopenten-2-yl ether, allyl vinyl ether, allyl octyl ether, vinyl methyl ether, vinyl isobutyl ether, allyl methyl ether), unsaturated alcohols (for example 1-buten-3-ol, 1-penten-ol-3, cinnamyl alcohol, allyl alcohol, crotyl alcohol, oleyl alcohol, citronellol, geraniol, linalool, alpha terpineol) and allyl halides (for example allyl chloride and allyl bromide). Generally the unsaturated compounds are liquids so that the percarboxylic acid can be dissolved therein.

The technical advance of the process of the invention first of all is in the possibility of using percarboxylic acids for oxidation in an essentially safer manner than could be done in the former vapor phase addition. By use of the unsaturated compound itself as the extractant or diluent the reaction time is sharply reduced because of the increased concentration of both the peracid and unsaturated compound compared with the known processes using solutions of percarboxylic acids in inert solvents. At the same time the yields are increased over those obtained with epoxidation processes with vapor form percarboxylic acids (for example compare British Pat. 1,053,972 Example 6). Additionally the working up is simplified since besides the unsaturated compound added in excess and the carboxylic acid arising from the percarboxylic acid no materials need to be separated from the reaction product. By the resulting higher space-time-yields the capacity of an existing plant can be considerably increased and the expense for the apparatus necessary for the working up reduced. In carrying out the process in continuous fashion, the water free mixture of percarboxylic acid and unsaturated compound are completely reacted, suitably by passing through correspondingly temperature regulated reaction tubes.

Unless otherwise indicated all parts and percentages are by weight.

The following examples further serve to illustrate the invention in application 60,872.

EXAMPLE 1

A mixture of 500 grams (5 moles) of allyl acetate and 121.3 grams of aqueous peracetic acid (47.7 weight percent peracetic acid, 0.75 mol) was azeotropically dehydrated in a vacuum (42 Torr) in a 1-meter Vigreux column having a water trap. The sump temperature of the column did not exceed 36° C. The separated water still contained 0.044 mol of peracetic acid which was returned to the column having an insufficient selectivity capacity. The sump product was subsequently held at normal pressure at a temperature of 50° C. whereby after 12 hours peracid was no longer detectable in the reaction mixture. By working up with a vacuum distillation to a maximum bath temperature of 50° C. there were obtained 67.7 grams of pure glycidyl acetate. This corresponds to a yield of 91% of theory based on the peracetic acids.

EXAMPLE 2

In the apparatus shown in the drawing 1 (effective column height 2 meters) 2.5 mols of 50.8 weight percent aqueous peracetic acid together with 8 mols (800 grams) of allyl acetate were dehydrated in a vacuum at a sump temperature of 50° C. The subsequent reaction to quantitative peracetic acid reaction took 13 hours at 50° C. By working up in a distillation there were obtained 258 grams of glycidyl acetate which corresponds to a yield of 89% of theory based on the peracetic acid.

EXAMPLE 3

In a 50 mm. diameter 2.50 meter long glass column filled with Raschig rings and equipped with a water trap and a return line for the organic phase separated from the head of the column at normal pressure there were continuously added hourly between the upper and middle thirds of the column 127 grams of aqueous peracetic acid (46.9 weight percent peracetic acid, 0.785 mol), and between the middle and the lower third of the column 492 grams (6.43 mols) of allyl chloride. The peracetic acid was dehydrated azeotropically. The sump temperature did not exceed 48° C. The water separated per hour still contained 0.0024 mol of peracetic acid. The correspondingly drawn off sump product had a peracetic acid content of about 6.5 weight percent (or 0.47 mol/hour), i.e. there had already occurred about a 40% reaction of the peracetic acid.

The sump product was subsequently held in a glass flask for 6 hours with reflux boiling at normal pressure at 50° C. By gas chromatography and titrimetrical determination of the epoxide in the reaction mixture there were found 12.8 weight percent epichlorhydrin and by titrimetrical determination there was found 0.12 weight percent of peracetic acid. This corresponds to a 98.7% peracetic acid reaction and an analytically detected epichlorhydrin yield of 97% of theory based on the peracetic acid.

EXAMPLE 4

In a 50 mm. diameter extraction column having 30 perforated plates (20% passage) and having an outer mantle cooled to about 5° C. there were continuously fed in countercurrent flow 3000 grams per hour (39.2 mol/hour) of allyl chloride and 407 grams per hour of aqueous peracetic acid (51.9 weight percent, 2.77 mol/hour). The continuously withdrawn organic phase (3160 grams/hour) contained 5.0 weight percent of peracetic acid (2.08 mol/hour), and 0.16 weight percent water (0.28 mol/hour). From 1000 grams of this mixture (0.66 mol peracetic acid; 12.40 mols allyl chloride; 0.09 mol water) there were distilled off in a packed column to remove water as an azeotrope with allyl chloride a total of 516 grams of allyl chloride and water at atmospheric pressure. The sump still contained 6.5 weight percent (0.415 mol) of peracetic acid, i.e. about 37% of the reaction of the peracetic acid had already taken place.

The sump product was subsequently held in a glass flask for 6 hours with reflux boiling at normal pressure at 46–50° C. In the reaction mixture there was found 11.6 weight percent epichlorhydrin (0.605 mol) by titrimetrical determination and 0.09 weight percent peracetic acid (0.006 mol) by titrimetrical determination. This corresponds to a 99% peracetic acid reaction and a yield of epichlorhydrin of 92% of theory based on the peracetic acid.

It has now been found that the process set forth in application 60,872 can be further improved for the production of epichlorhydrin by employing aqueous solutions of perpropionic acid or perbutyric acid and extracting with allyl chloride, wherein the mixture of epichlorhydrin, propionic acid or butyric acid and allyl chloride, resulting from the reaction, is separated by distillation.

By employing the named percarboxylic acids, it is possible to separate the reaction mixture by distillation. In contrast, this is difficult to carry out when using peracetic acid as the oxidizing agent on account of the closely situated boiling point of acetic acid (117.5° C.) and epichlorhydrin (116.1° C.) at normal pressure. Besides, epichlorhydrin and acetic acid form a minimum azeotrope at 115° C. under normal pressure.

A direct distillation separation on the other hand is simple if instead of acetic acid in the reaction mixture to be separated, propionic acid, n-butyric acid or isobutyric acid are formed. Their boiling points at normal pressure (atmospheric pressure) are 141° C. (propionic acid), 162° C. (n-butyric acid) or 154° C. (isobutyric acid). Besides, they do not form an azeotrope with epichlorhydrin.

The distillation separation of epichlorhydrin from the carboxylic acid is most preferably carried out under reduced pressure, e.g. 10 to 400 Torr. Thereby, reaction of the epichlorhydrin with the basic acid formed is substantially avoided because it is possible to operate at lower temperature. Experiments have shown that in the absence of water at a molar ratio of epichlorhydrin to carboxylic acid of 1:1 at 80° C. and short residence times the acidolysis is negligibly small in the case of propionic acid. Even in the extraction of the named aqueous percarboxylic acid solutions with allyl chloride there are advantages since the partition coefficient of peracetic acid between allyl chloride and water at room temperature is only 0.08 to 0.09 compared to the unexpectedly high partition coefficient of perpropionic acid between allyl chloride and water at room temperatures of 0.55 to 0.60.

From an about 51% aqueous perpropionic acid solution there can be obtained solutions with up to 30 weight perpropionic acid in allyl chloride. With either per-n-butyric acid or perisobutyric acid the ratio is still more favorable.

The speed of reaction of perpropionic acid with allyl chloride employed in excess is about the same as that of peracetic acid with allyl chloride under comparable conditions.

In the reaction of allyl chloride with perpropionic acid, per n-butyric acid or perisobutyric acid the allyl chloride is used in excess, e.g. in a molar ratio of allyl chloride to per acid of 1.2:1 to 25:1. After the resulting reaction to form epichlorhydrin and carboxylic acid (propionic acid, n-butyric acid or isobutyric acid) the allyl chloride together with the epichlorhydrin can be separated distillatively. Since, as already mentioned above, the distillation suitably is carried out under reduced pressure, the distillate must be condensed at corresponding lower temperatures to avoid loss of epichlorhydrin and especially of allyl chloride. By "reduced pressure" there is meant, for example, pressures of about 80 Torr.

However, it is also possible to carefully carry out the separation of the reaction mixture at moderate vacuum or normal pressure, preferably 100 to 400 Torr.

Figure 2:
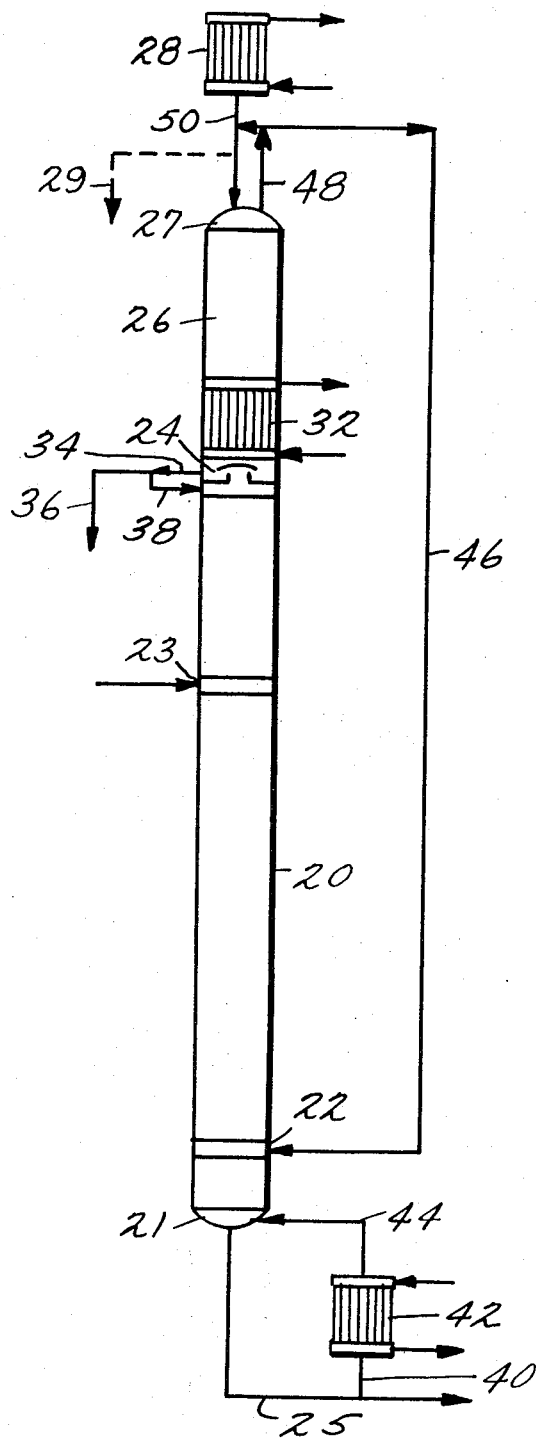

This procedure is shown schematically in FIG. 2.

Referring more specifically to FIG. 2, there is provided a column 20. A short distance above the sump 21 of the column allyl chloride vapor is injected at 22, by which there is attained the reduction of the partial vapor pressure of the epichlorhydrin and carboxylic acid (propionic acid, n-butyric acid or isobutyric acid) to be separated. The allyl chloride injected at 22 amounts to about 0.5 to 10 times the amount of allyl chloride in the reaction mixture. A mixture of allyl chloride, epichlorhydrin and carboxylic acid is fed into the column 20 at the place 23 at which the same concentration of carboxylic acid prevails in the liquid phase inside the column. This point can be determined by routine testing of the contents of the column. By partial condensation at 24 with the aid of condenser 32 a practically carboxylic acid free liquid mixture can be drawn off through conduits 34 and 36 and partially returned to the column as reflux through conduit 38 which liquid mixture corresponds to about the feed composition with respect to the allyl chloride and epichlorhydrin.

The sump product is kept boiling by means of a heat exchanger 42. Carboxylic acid practically free of epichlorhydrin and free of allyl chloride is drawn off from the sump 21.

In the portion of 26 of the column 20 above the partial condenser 32 the refluxing allyl chloride forces back the epichlorhydrin at 24 and it does not enter the upper portion 26 of the column. The allyl chloride vapor stream leaving the top 27 of the column is practically free of epichlorhydrin and carboxylic acid and is divided as follows: The largest part is forced back for example, with the aid of a blower, via conduits 48 and 46 into the lower part of the column at 22 (as set forth above); the smaller portion goes via conduits 48 and 50 to condenser 28 where it is totally condensed and is returned as reflux to the column portion 26 at 27. By choice of the condensation temperature in condenser 32 there can be obtained at 24 a practically carboxylic acid free condensate which has a smaller allyl chloride:epichlorohydrin ratio than the feed mixture. In this case the excess allyl chloride can be recovered as distillate of high purity from the head of the column through conduit 29.

EXAMPLE 5

Production of the reaction mixture

In an extraction column having a diameter of 50 mm. with 60 perforated plates (20% passage) there were fed countercurrently at room temperature 2060 grams per hour (26.9 mols/hour) of allyl chloride and 360 grams per hour of aqueous perpropionic acid solution (49.3 weight percent, 1.97 mols/hour). The continuously withdrawn organic phase (2245 grams/hour) contained 7.8 weight percent of perpropionic acid (1.95 mols/hour) and 0.4 weight percent water (0.5 mol/hour). In order to remove the water as an azetrope with allyl chloride there were distilled off in a packed column 1305 grams per hour of allyl chloride and water at atmospheric pressure with partial reflux of the upper phase of the distillate which had separated into two phases. About a 55% perpropionic acid had already reacted in the column and in the sump of the column. The sump product was subsequently held at boiling in three cascade reactors at normal pressure; after a total residence time of about 6.5 hours there was obtained a nearly 98% reaction of the perpropionic acid.

Separation of the reaction mixture

The reaction product consisting of epichlorhydrin, propionic acid, excess allyl chloride, the small residual amount of perpropionic acid and small amounts of high boiling by-products after preheating to 80° C. was fed into a V4A wire mesh spiral filled column 50 mm. in diameter and 150 cm. high at a point 50 cm. above the sump. The greatest part of the allyl chloride distilled off over the top at a reflux ratio of 0.5 and a temperature in the sump (circulatory evaporator) of about 75° C. at normal pressure. The sump contents were continually supplied to the middle of another column filled with V4A wire mesh spirals having a diameter of 30 mm. and a length of 280 cm. At a working pressure of 80 torr and a reflux ratio of 5 there were recovered (including a product from a cooling trap in the vacuum line cooled to −78° C.) all together 234 grams per hour of a composition of 70.1 weight percent epichlorhydrin (1.77 mols/hour), 29.2 weight percent allyl chloride and 0.7 weight percent propionic acid. The residual allyl chloride was quantitatively separated therefrom by distillation and the epichlorhydrin recovered in pure form. From the sump (thin layer evaporator) there were recovered 155 grams/hour; the sump product contained, besides propionic acid and a small amount of high boiling byproducts, only 0.45 weight percent epichlorhydrin (0.01 mol/hour). This corresponds to a total yield of epichlorhydrin of over 91% based on 100% reaction of the extracted perpropionic acid.

EXAMPLE 6

In the manner of Example 5, 337 grams/hour of 49.1% aqueous perpropionic acid was reacted with 953 grams/hour of allyl chloride and after separation of 418 grams/hour of allyl chloride during the reaction, the product was fed to a column as shown in FIG. 2 having a diameter of 40 mm. and a height of 210 cm. and separated by distillation at 250 torr working pressure and a reflux ratio of 2 at the partial condenser 32 with an operating vapor amount of 450 grams/hour of allyl chloride the following separation of the reaction mixture was produced (all data is in weight percent).

Distillate from the partial condenser 32 643 grams/hour:

|  | Percent |
|---|---|
| Allyl chloride | 75.8 |
| Epichlorhydrin | 24.0 |
| Propionic acid | 0.2 |

Distillate drawn off at the top 27 of the column, 39 grams/hour:

|  | Percent |
|---|---|
| Allyl chloride | 99.7 |
| Epichlorhydrin | 0.3 |

Sump drawn off at 25, 146 grams/hour:

|  | Percent |
|---|---|
| Allyl chloride | 0.2 |
| Epichlorhydrin | 0.2 |
| Propionic acid | 91.8 |
| High boiling byproducts | 7.8 |

What is claimed is:

1. In a process for the production of epichlorhydrin by reacting allyl chloride with an aqueous percarboxylic acid solution, the allyl chloride being present in an amount in excess of that required for the reaction and the separation of the water from the percarboxylic acid, the improvement comprising employing as the percarboxylic acid a member of the group consisting of perpropionic acid, per n-butyric acid and perisobutyric acid, separating the percarboxylic acid from the water by distilling the water with allyl chloride introducing into the mid area of a single column a reaction mixture containing:

(1) the epichlorhydrin formed,
(2) the carboxylic acid formed, and
(3) the allyl chloride, carrying out in said column distillation in order to:

(a) recover carboxylic acid practically free of epichlorhydrin and practically free of allyl chloride from the bottom of the column,
(b) obtain a mixture of epichlorhydrin and allyl chloride above said place of introduction of (1), (2) and (3) into said column, condensing and removing from the column above said place of introduction a portion of the allyl chloride and substantially all of the epichlorhydrin in said mixture of epichlorhydrin and allyl chloride, and
(c) obtain the remaining allyl chloride from the top of the column dividing the distilled allyl chloride into two parts, condensing at least a portion of the smaller of said two parts of allyl chloride and returning it to the top of said column and introducing the larger of said two parts of allyl chloride into the lower portion of the column and employing it as driving vapor to carry the epichlorhydrin to the upper part of the column above said place of introduction of (1), (2) and (3).

2. A process according to claim 1 wherein the percarboxylic acid is perpropionic acid and the carboxylic acid drawn off is propionic acid.

3. A process according to claim 1 wherein the separation of the reaction mixture is carried out at 100 to 400 Torr.

4. A process according to claim 1 wherein the mixture is introduced into the column at a place in the column in which the concentration of the carboxylic acid in said mixture is the same as in the liquid phase inside the column.

References Cited

FOREIGN PATENTS

| 869,097 | 5/1961 | Great Britain | 260—348 R |
| 972,048 | 5/1963 | Great Britain | 260—348.5 L |
| 1,076,288 | 7/1967 | Great Britain | 260—348.5 L |
| 1,942,557 | 3/1971 | Germany | |
|  |  | (Offenlegungsschrift) | |

NORMA S. MILESTONE, Primary Examiner